United States Patent
Lin et al.

(10) Patent No.: US 11,537,436 B2
(45) Date of Patent: Dec. 27, 2022

(54) METHOD OF CONFIGURING A MEMORY BLOCK ALLOCATION OF A MACHINE LEARNING NETWORK

(71) Applicant: QUALCOMM Incorporated, San Diego, CA (US)

(72) Inventors: Jamie Menjay Lin, San Diego, CA (US); Edwin Chongwoo Park, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 564 days.

(21) Appl. No.: 16/591,533

(22) Filed: Oct. 2, 2019

(65) Prior Publication Data

US 2021/0103473 A1    Apr. 8, 2021

(51) Int. Cl.
*G06F 9/50*    (2006.01)
(52) U.S. Cl.
CPC ...... *G06F 9/5016* (2013.01); *G06F 2209/501* (2013.01)
(58) Field of Classification Search
None
See application file for complete search history.

(56) References Cited

U.S. PATENT DOCUMENTS

| | | | | |
|---|---|---|---|---|
| 9,753,846 | B2 * | 9/2017 | Baluch | G06F 9/45558 |
| 10,873,456 | B1 * | 12/2020 | Dods | G06N 20/00 |
| 11,308,395 | B2 * | 4/2022 | Han | G06N 3/0481 |
| 2002/0087611 | A1 * | 7/2002 | Tanaka | G06F 11/3433 |
| | | | | 718/1 |
| 2014/0025890 | A1 * | 1/2014 | Bert | G06F 12/08 |
| | | | | 711/118 |
| 2017/0148222 | A1 * | 5/2017 | Holzer | G06T 3/4038 |
| 2019/0236445 | A1 * | 8/2019 | Das | G06N 3/08 |
| 2020/0184333 | A1 * | 6/2020 | Oh | G06N 3/0454 |
| 2020/0234146 | A1 * | 7/2020 | Lee | G06F 9/5016 |
| 2020/0380365 | A1 * | 12/2020 | Karino | G06N 3/0472 |
| 2021/0089355 | A1 * | 3/2021 | Huang | G06F 9/5016 |
| 2021/0401376 | A1 * | 12/2021 | Roveda | A61B 5/4064 |

OTHER PUBLICATIONS

Huang et al.; "Convolutional Networks with Dense Connectivity"; IEEE 2019; (Huang_2019.pdf, pp. 1-12) (Year: 2019).*
Yu et al.; "A Novel Deep Learning Network Architecture with Cross-Layer Neurons" IEEE 2016; (Yu_2016.pdf; pp. 111-117) (Year: 2016).*

* cited by examiner

*Primary Examiner* — Hiren P Patel
(74) *Attorney, Agent, or Firm* — Holland & Hart LLP

(57) ABSTRACT

Methods, systems, and devices for configuring a machine learning network are described. A device, which may be otherwise known as user equipment (UE), may support ultra-low power sensor applications. More specifically, the device may support memory block allocation of a machine learning network based on performance levels associated with the applications. For example, the device may identify a performance level associated with an application on the device. The device may determine that the performance level satisfies a condition, and subsequently determine a memory block allocation of a machine learning network of the device based on the performance level satisfying the condition. The memory block allocation may correspond to one or more connections of the machine learning network. Based on the memory block allocation, the device may adjust a quantity of memory blocks available for the machine learning network and process the application.

20 Claims, 10 Drawing Sheets

METHOD OF CONFIGURING A MEMORY BLOCK ALLOCATION OF A MACHINE LEARNING NETWORK

FIELD OF INVENTION

The following relates generally to configuring a machine learning network, and more specifically to configuring a memory block allocation of the machine learning network.

BACKGROUND

Some example devices may support use of various machine learning algorithms. In some examples, a machine learning network may support use of the various machine learning algorithms for one or more ultra-low power sensor applications, for example, such as computer vision applications, sensing applications, among other examples. A machine learning network may include, for example, a neural network, a deep learning network, a convolutional neural network, among other examples. In some examples, one or more of the above example machine learning networks may correspond to memory resources (e.g., memory block allocation) of the example devices. For example, the example devices may include various types of memory, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. As demand for more efficient machine learning networks increases, some ultra-low power sensor applications may be inefficient and consume an unnecessary amount of resources of the example devices, for example, memory resources and increase average power consumption.

SUMMARY

The described techniques relate to improved methods, systems, devices, and apparatuses that support ultra-low power sensor applications, and more specifically a memory block allocation (e.g., activating one or more memory blocks) associated with a machine learning network (e.g., a neural network, a deep neural network, a convolutional neural network) based on a performance level. An example device may include one or more logical switches for enabling controllable connections (e.g., one or more cross-layer identity connections) in the machine learning network, effectively providing controllable performance and memory allocation (e.g., activation of one or more memory blocks) for processing different types of applications and operations. For example, the device may use the one or more logical switches to adaptively support shortcut connections in the machine learning network to reduce or increase activation of memory blocks, effectively reducing data movement and operations and achieving significant power savings (e.g., in the case of reducing the activation memory blocks) or achieving full accuracy performance (e.g., in the case of increasing the activation memory blocks).

A method is described. The method may include identifying a performance level associated with an application on a device, determining, based on identifying the performance level, that the performance level satisfies a condition, determining a memory block allocation of a machine learning network of the device based on the performance level satisfying the condition, the memory block allocation corresponding to one or more connections of the machine learning network, adjusting a quantity of memory blocks available for the machine learning network of the device based on the memory block allocation, and processing the application by the device based on the memory block allocation.

An apparatus is described. The apparatus may include a processor, memory coupled with the processor, and instructions stored in the memory. The instructions may be executable by the processor to cause the apparatus to identify a performance level associated with an application on a device, determine, based on identifying the performance level, that the performance level satisfies a condition, determine a memory block allocation of a machine learning network of the device based on the performance level satisfying the condition, the memory block allocation corresponding to one or more connections of the machine learning network, adjust a quantity of memory blocks available for the machine learning network of the device based on the memory block allocation, and process the application by the device based on the memory block allocation.

Another apparatus is described. The apparatus may include means for identifying a performance level associated with an application on a device, determining, based on identifying the performance level, that the performance level satisfies a condition, determining a memory block allocation of a machine learning network of the device based on the performance level satisfying the condition, the memory block allocation corresponding to one or more connections of the machine learning network, adjusting a quantity of memory blocks available for the machine learning network of the device based on the memory block allocation, and processing the application by the device based on the memory block allocation.

A non-transitory computer-readable medium storing code is described. The code may include instructions executable by a processor to identify a performance level associated with an application on a device, determine, based on identifying the performance level, that the performance level satisfies a condition, determine a memory block allocation of a machine learning network of the device based on the performance level satisfying the condition, the memory block allocation corresponding to one or more connections of the machine learning network, adjust a quantity of memory blocks available for the machine learning network of the device based on the memory block allocation, and process the application by the device based on the memory block allocation.

Some examples of the method, apparatuses, and non-transitory computer-readable medium described herein may further include operations, features, means, or instructions for modifying a configuration for the one or more connections of the machine learning network based on the quantity of memory blocks, where processing the application by the device may be based on the modified configuration.

In some examples of the method, apparatuses, and non-transitory computer-readable medium described herein, modifying the configuration may include operations, features, means, or instructions for configuring one or more logical switches associated with the machine learning network based on the modified configuration.

In some examples of the method, apparatuses, and non-transitory computer-readable medium described herein, modifying the configuration may include operations, features, means, or instructions for selecting one or more paths of the machine learning network based on the modified configuration, where the one or more paths of the machine learning network may be in connection with a residual memory block of the machine learning network.

In some examples of the method, apparatuses, and non-transitory computer-readable medium described herein, modifying the configuration may include operations, features, means, or instructions for configuring one or more cross-layer identity connections associated with the machine learning network, where the one or more cross-layer identity connections may be associated with one or more of the memory blocks and the one or more connections of the machine learning network.

In some examples of the method, apparatuses, and non-transitory computer-readable medium described herein, modifying the configuration may include operations, features, means, or instructions for configuring one or more weights associated with the machine learning network may be based on the modified configuration.

In some examples of the method, apparatuses, and non-transitory computer-readable medium described herein, determining that the performance level satisfies the condition may include operations, features, means, or instructions for determining that the performance level may be below a performance threshold, and where adjusting the quantity of memory blocks available for the machine learning network includes: reducing the quantity of the memory blocks available for the machine learning network based on determining that the performance level may be below the threshold.

In some examples of the method, apparatuses, and non-transitory computer-readable medium described herein, the performance threshold includes one or more of an accuracy threshold level, a processing time threshold, a processing throughput threshold, a processing latency threshold, a memory usage threshold, or a power usage threshold.

In some examples of the method, apparatuses, and non-transitory computer-readable medium described herein, determining that the performance level satisfies the condition may include operations, features, means, or instructions for determining that the performance level may be above a performance threshold, and where adjusting the quantity of memory blocks available for the machine learning network includes: increasing the quantity of the memory blocks available for the machine learning network based on determining that the performance level may be above the threshold.

In some examples of the method, apparatuses, and non-transitory computer-readable medium described herein, adjusting the quantity of the memory blocks available for the machine learning network may include operations, features, means, or instructions for toggling one or more memory blocks of the quantity of the memory blocks available for the machine learning network, and where toggling the one or more memory blocks includes powering ON the one or more memory blocks or powering OFF the one or more memory blocks.

Some examples of the method, apparatuses, and non-transitory computer-readable medium described herein may further include operations, features, means, or instructions for identifying an expansion ratio associated with the machine learning network, where adjusting the quantity of the memory blocks available for the machine learning network may be based on the expansion ratio.

In some examples of the method, apparatuses, and non-transitory computer-readable medium described herein, the performance level includes one or more of an accuracy level, a processing time, a processing throughput, a processing latency, a memory usage, or a power usage.

In some examples of the method, apparatuses, and non-transitory computer-readable medium described herein, the machine learning network includes one or more of a neural network, a residual network, or a deep learning network.

DETAILED DESCRIPTION

Figure 1:
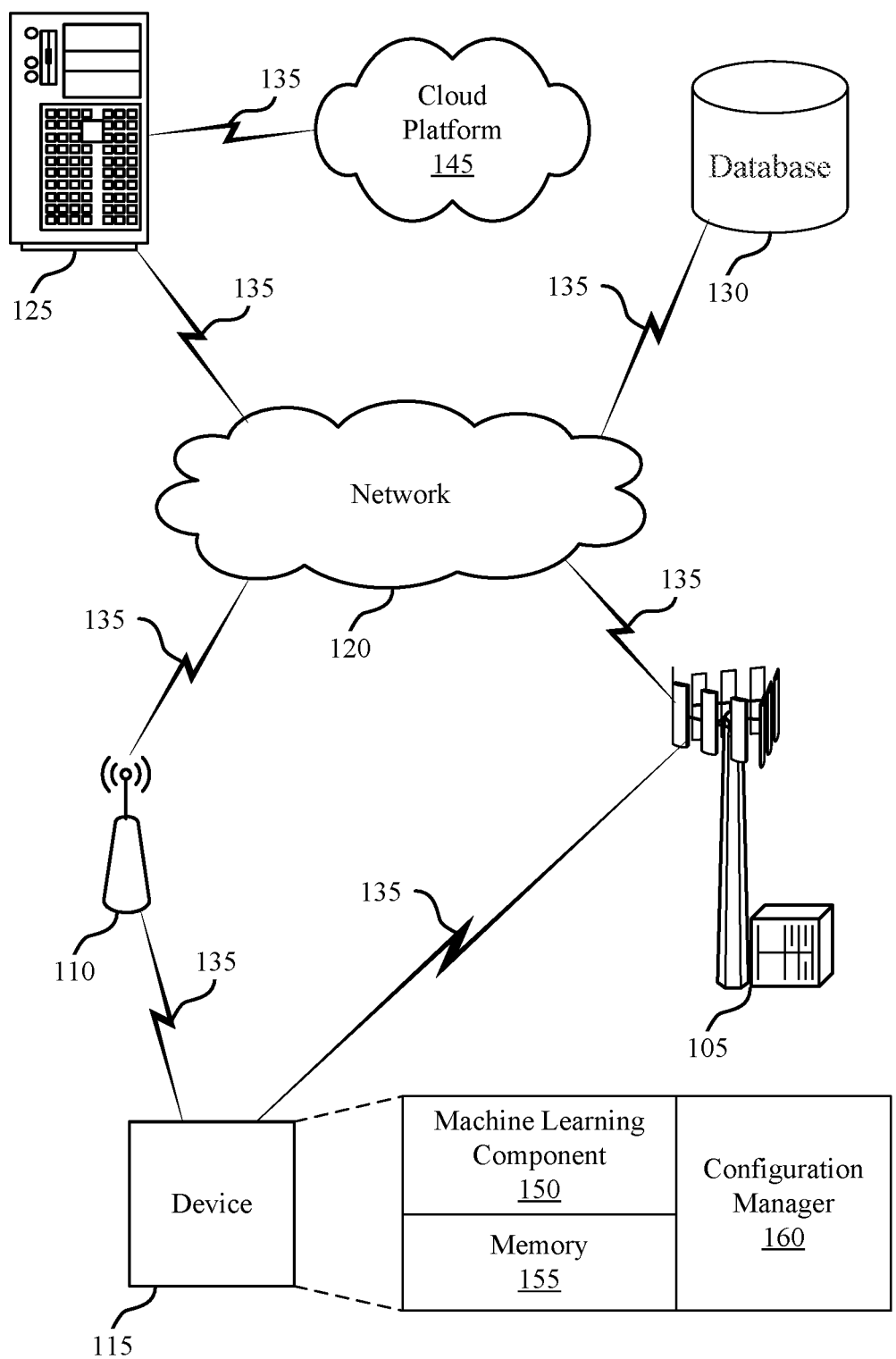
FIG. 1 illustrates an example of a system for configuring a machine learning network that supports configuring a memory block allocation of a machine learning network in accordance with aspects of the present disclosure.

Some devices may support various applications, such as ultra-low power sensor applications, among other examples (e.g., computer vision applications). In some examples, the devices may support the ultra-low power sensor applications using one or more machine learning networks, such as neural networks, convolutional neural networks, deep neural networks, to enable more efficient operations related to the ultra-low power sensor applications. By way of example, use of machine learning networks for applications, such as image recognition (e.g., deep residual learning, residual neural networks) may enable the devices to experience improvements in accuracy and performance of image recognition related operations. In other examples, use of machine learning networks including depthwise separable convolution (e.g., a MobileNet) and related enhancements associated with bottleneck residual blocks (e.g., a MobileNetV2 associated with inverted residuals and linear bottlenecks, Shufflenet associated with efficient convolutional neural networks for the devices) may reduce a complexity of related to neural network operations.

Some example techniques may focus on criteria such as model performance (e.g., accuracy performance) and associated tradeoffs between complexity (e.g., computation complexity) and model size. For example, some example practical realizations (e.g., device implementation) of machine learning network models may support implementation of an activation memory size at multiple layers of a machine learning network (e.g., for input or intermediate features at the neural network layer levels). By way of example, some devices may support applying machine learning networks (e.g., internet of things (IoT)-like energy-efficient neural networks) to various applications, such as ultra-low power sensor applications (e.g., computer vision applications). In some examples, low-power devices may be small in size (e.g., ultra-low-power devices, microsensors, nano-sensors) and have relatively smaller neural network kernels or shallower layers (e.g., a smaller number of neural network layers) compared to larger devices, and example devices may support including activation memory which may accommodate operations of a machine learning network (e.g., intermediate features at the neural network layer levels) such as capturing or processing images (e.g., images having a resolution of 640×480 pixels or larger).

Some example implementations of an activation memory at multiple layers of a machine learning network may provide advancements to machine learning networks. In some examples, improving activation memory size design may be further beneficial to devices. For example, in some example implementations, improving activation memory size design may increase efficiency in memory access (e.g., memory access operations) and reduce unnecessary use resources (e.g., power consumption) among example operations such as machine learning (e.g., convolutional neural network, neural network) operations. Accordingly, example techniques described herein may minimize practical memory constraints for a machine learning network architecture (e.g., for average use of residual convolutional neural networks), while maintaining or increasing performance capabilities. In some examples, the described techniques relate to improved methods, systems, devices, and apparatuses that may support variable run-time memory use which may obtain improvements in data movement and power consumption (e.g., reduced amounts of data movement and power consumption) associated with a machine learning network (e.g., by a factor of 4 for a ResNet-like family, by a factor of up to 64 for ResNeXt family, based on average use cases).

According to examples of aspects described herein, the described techniques relate to improved methods, systems, devices, and apparatuses that support ultra-low power applications (e.g., computer vision, sensing applications), and more specifically memory block (e.g., activation memory block) allocation of a machine learning network based on a performance level associated with the applications. An example device may include logical switches for enabling controllable connections (e.g., cross-layer identity connections) in a machine learning network, effectively providing controllable performance and associated memory allocations (e.g., activation memory blocks) for processing different types of applications and operations. For example, the device may use the logical switches to adaptively support shortcut connections in the machine learning network to reduce or increase activation memory blocks, effectively reducing data movement and operations and achieving significant power savings (e.g., in the case of reducing the activation memory blocks) or achieving full accuracy performance (e.g., in the case of increasing the activation memory blocks).

Aspects of the subject matter described herein may be implemented to realize one or more advantages. The described techniques may support configuring a memory block allocation of a machine learning network, supporting improvements in power savings, performance capabilities, and user experience, among other advantages. Supported techniques may include features for memory block allocation of a machine learning network based on a performance level associated with an application on a device, thereby reducing processing time, complexity, memory usage, and power usage of systems compared to some processes (e.g., ultra-low power applications).

Aspects of the disclosure are initially described in the context of a wireless communications system. Aspects of the disclosure are then described with reference to diagrams and process flows. Aspects of the disclosure are further illustrated by and described with reference to apparatus diagrams, system diagrams, and flowcharts that relate to method of configuring a memory block allocation of a machine learning network.

FIG. 1 illustrates an example of a system 100 that supports configuring a memory block allocation of a machine learning network in accordance with aspects of the present disclosure. The system 100 may include a base station 105, an access point 110, a device 115, a server 125, a database 130, and a cloud platform 145. The base station 105, the access point 110, the device 115, the server 125, and the database 130 may communicate with each other via a network 120 using communications links 135. In some examples, the system 100 may support memory block allocation (e.g., variable memory block allocation), thereby providing enhancements to ultra-low power sensor applications.

The base station 105 may wirelessly communicate with the device 115 via one or more base station antennas. The base station 105 described herein may include or may be referred to by those skilled in the art as a base transceiver station, a radio base station, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

The device 115 may incorporate aspects for memory block allocation of a machine learning network based on a performance level (e.g., accuracy, complexity, power consumption). The techniques described herein for using memory block allocation and machine learning schemes may support functions (e.g., autonomous or semi-autonomous) related to, for example, ultra-low power sensor applications. In an example, the device 115 may identify a performance level associated with an application on the device 115, determine, based on identifying the performance level, that the performance level satisfies a condition, and determine a memory block allocation of a machine learning network of the device 115 based on the performance level satisfying the condition. The memory block allocation may correspond to one or more connections of the machine learning network. In some examples, the device 115 may adjust a quantity of memory blocks available for the machine learning network and process the application, based on the memory block allocation.

The device 115 may, additionally or alternatively, include or be referred to by those skilled in the art as a user equipment (UE), a user device, a cellular phone, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

The device 115 may include a machine learning component 150, a memory 155, and a configuration manager 160. The machine learning component 150 and the configuration manager 160 may be implemented by aspects of a processor, for example, such as a processor 840 described in FIG. 8. The machine learning component 150 may include a machine learning network (e.g., a neural network, a deep neural network, a convolutional neural network). The configuration manager 160 may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The configuration manager 160 may be configured to process data (e.g., application data) from and/or write data to the memory 155. The configuration manager 160 may also be configured to provide memory block allocation of the machine learning network.

In some examples, the device 115 may support modifying a configuration for one or more connections of the machine learning network based on a quantity of memory blocks and processing an application based on the modified configuration, according to the techniques described herein. For example, the device 115 may support configuring one or more logical switches associated with the machine learning network, selecting one or more paths of the machine learning network, configuring one or more cross-layer identity connections associated with the machine learning network, or configuring one or more weights associated with the machine learning network, based on the modified configuration, according to the techniques described herein.

The memory 155 may be, for example, a random-access memory (RAM), a memory buffer, a hard drive, a database, an erasable programmable read-only memory (EPROM), an electrically erasable programmable read-only memory (EEPROM), a read-only memory (ROM), a flash memory, a hard disk, a floppy disk, cloud storage, and/or so forth. In some examples, the device 115 may include one or more hardware-based modules (e.g., DSP, FPGA, ASIC) and/or software-based modules (e.g., a module of computer code stored at the memory and executed at the processor, a set of processor-readable instructions that may be stored at the memory 155 and executed at the configuration manager 160) associated with executing an application, such as, for example, memory block allocation (e.g., variable memory block allocation0 of a machine learning network based on a performance level.

The network 120 that may provide encryption, access authorization, tracking, Internet Protocol (IP) connectivity, and other access, computation, modification, and/or functions. Examples of the network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. The network 120 may include the Internet.

The server 125 may include any combination of a data server, a cloud server, a proxy server, a mail server, a web server, an application server, a map server, a road assistance server, a database server, a communications server, a home server, a mobile server, or any combination thereof. The server 125 may also transmit to the device 115 a variety of information, such as instructions or commands relevant to ultra-low power applications, memory block allocation based on a performance level associated with the applications, and configuration of a machine learning network (e.g., connection configurations, logical switch configurations, path selections associated with the machine learning network). The database 130 may store data that may include instructions or commands related to memory block allocation and connection configurations. The device 115 may retrieve the stored data from the database 130 via the base station 105 and/or the access point 110. The cloud platform 145 may be an example of a public or private cloud network. The device 115 may also be referred to here as a cloud client, which may access the cloud platform 145 over the network 120. In some examples, a cloud client may access the cloud platform 145 to store, manage, and process data associated with memory block allocation and configurations of a machine learning network.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. Communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
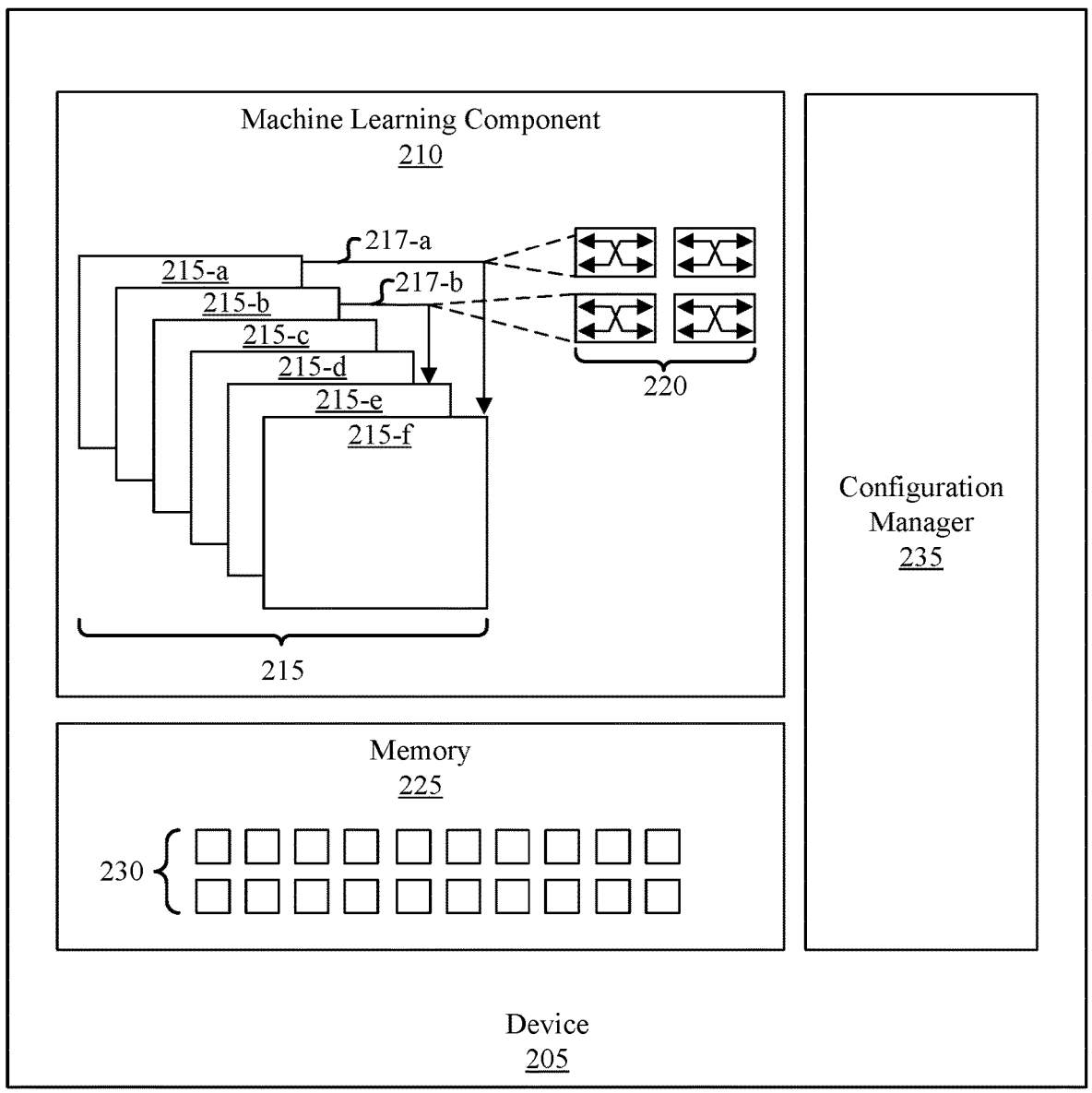
FIG. 2 illustrates a block diagram of a device that supports configuring a memory block allocation of a machine learning network in accordance with aspects of the present disclosure.

FIG. 2 illustrates a block diagram 200 of a device 205 that supports configuring a memory block allocation of a machine learning network in accordance with aspects of the present disclosure. The device 205 may be an example of aspects of a device 115 as described herein. The device 205 may include a machine learning component 210, memory 225, and a configuration manager 235.

The machine learning component 210 may be an example of aspects of the machine learning component 150 described herein. The machine learning component 210 may include a machine learning network (e.g., a neural network, a deep neural network, a convolutional neural network). In some examples, the machine learning component 210 may include one or more layers 215 (e.g., neural network layers, convolution layers), and one or more logical switches 220. In some examples, the machine learning component 210 may receive one or more input signals at an input layer or a first layer (e.g., a layer 215-$a$) and provide output signals via an output layer or a last layer (e.g., a layer 215-$f$). The machine learning component 210 may process the one or more input signals, for example, utilizing one or more intermediate layers (e.g., one or more intermediate hidden layers, such as layers 215-$b$ through 215-$e$). In some examples, each of the layers 215-$a$ through 215-$f$ may include one or more nodes (e.g., one or more neurons) arranged therein and may provide one or more activation functions.

The machine learning component 210 may also include connections (e.g., edges, paths) between the one or more nodes included in adjacent layers (e.g., between a node in the layer 215-$a$ and a node in the layer 215-$b$, between a node in the layer 215-$b$ and a node in the layer 215-$c$). Each of the connections may have an associated weight (e.g., a weighting factor, a weighting coefficient). The weights, for example, may be assignable by the machine learning component 210. In some examples, the machine learning component 210 may include one or more shortcut paths, which the machine learning component 210 may bypass any of the intermediate layers. For example, the machine learning component 210 may include a shortcut path 217-a between the layers 215-a and 215-f which may bypass the layers 215-b through 215-e. In some examples, the machine learning component 210 may include a shortcut path 217-b between the layers 215-b and 215-e which may bypass the layers 215-c and 215-d. In some examples, the device 205 may train and implement the machine learning component 210 at various processing stages to provide processing improvements (e.g., application processing). For example, the device 205 may train and implement the machine learning component 210 to improve processing efficiency while maintaining accuracy above a threshold during processing.

The one or more logical switches 220 may include, for example, logic circuits (e.g., multiplexer components). In some examples, the one or more logical switches 220 may be connected to any of the layers 215-a through 215-f or any of the shortcut paths 217-a and 217-b. The shortcut paths 217-a and 217-b may be, for example, cross-layer identity connections and may each include an identity function. In some examples, the machine learning component 210 may configure one or more of the one or more logical switches 220 to enable or disable one or more of the shortcut paths 217-a and 217-b. The memory 225 may be an example of aspects of the memory 155 described herein. The memory 225 may include one or more memory blocks 230 (e.g., memory cells). In some examples, the memory blocks 230 may include activation memory blocks (e.g., activation memory cells).

The configuration manager 235 may be an example of aspects of the configuration manager 160 described herein. According to examples of aspects described herein, the configuration manager 235 may identify a performance level associated with an application on the device 205 and determine, based on identifying the performance level, that the performance level satisfies a condition (e.g., that the performance level is below a performance threshold, that the performance level is above a performance threshold). The performance threshold may include, for example, an accuracy threshold level, a processing time threshold, a processing throughput threshold, a processing latency threshold, a memory usage threshold, or a power usage threshold.

In some examples, the configuration manager 235 may determine a memory block allocation of the machine learning component 210 based on the performance level satisfying the condition. In an example, the configuration manager 235 may adjust a quantity of the memory blocks 230 available for the machine learning component 210 based on the memory block allocation. The memory block allocation, for example, may correspond to one or more connections of the machine learning component 210 (e.g., connections between nodes included in adjacent layers among layers 215-b through 215-e).

In some examples, the configuration manager 235 may increase the quantity of the memory blocks 230 available based on determining that the performance level is below a performance threshold or may decrease the quantity of the memory blocks 230 available based on determining that the performance level is above or below a performance threshold. In some examples, the configuration manager 235 may adjust the quantity of the memory blocks 230 based on an expansion ratio associated with the machine learning component 210. In adjusting (e.g., increasing, decreasing) the quantity of the memory blocks 230, for example, the configuration manager 235 may toggle (e.g., power ON or OFF) one or more of the memory blocks 230. According to examples of aspects described herein, the device 205 may process the application based on the memory block allocation.

The configuration manager 235 may, for example, modify a configuration for one or more connections of the machine learning component 210 based on the quantity of memory blocks. In some examples, the configuration manager 235 may configure one or more of the logical switches 220 based on the modified configuration. For example, the configuration manager 235 may toggle one or more of the logical switches 220 based on the modified configuration, such that the machine learning component 210 may bypass (e.g., via the shortcut paths 217-a or 217-b) one or more of the intermediate layers 215-b through 215-e. In another example, the configuration manager 235 may configure one or more weights associated with the machine learning component 210 based on the modified configuration. According to examples of aspects described herein, the device 205 may process the application based on the modified configuration, the memory block allocation described herein, or both.

According to examples of aspects described herein, the device 205 may include features for selecting one or more paths of the machine learning network based on the modified configuration, where the one or more paths of the machine learning network are in connection with a residual memory block of the machine learning network. In some examples, the device 205 may configure one or more weights associated with the machine learning network based on the modified configuration. In some examples, the device 205 may identify an expansion ratio associated with the machine learning network and adjust the quantity of memory blocks further based on the expansion ratio.

Aspects of the subject matter described herein may be implemented to realize one or more advantages. For example, determining a memory block allocation of a machine learning network (e.g., the machine learning component 210) based on a performance level of an application on the device 205, where the memory block allocation corresponds to one or more connections of the machine learning network, may be implemented to realize one or more advantages associated with memory propagation and memory usage. For example, adjusting (e.g., increasing, decreasing) a quantity of memory blocks available for the machine learning network, and modifying a configuration for one or more connections of the machine learning network (e.g., configuring one or more logical switches associated with the machine learning network) based on the memory block allocation may exploit shortcut paths for improved processing efficiency and power savings, which may provide faster converging times within the machine learning network.

Figure 3:
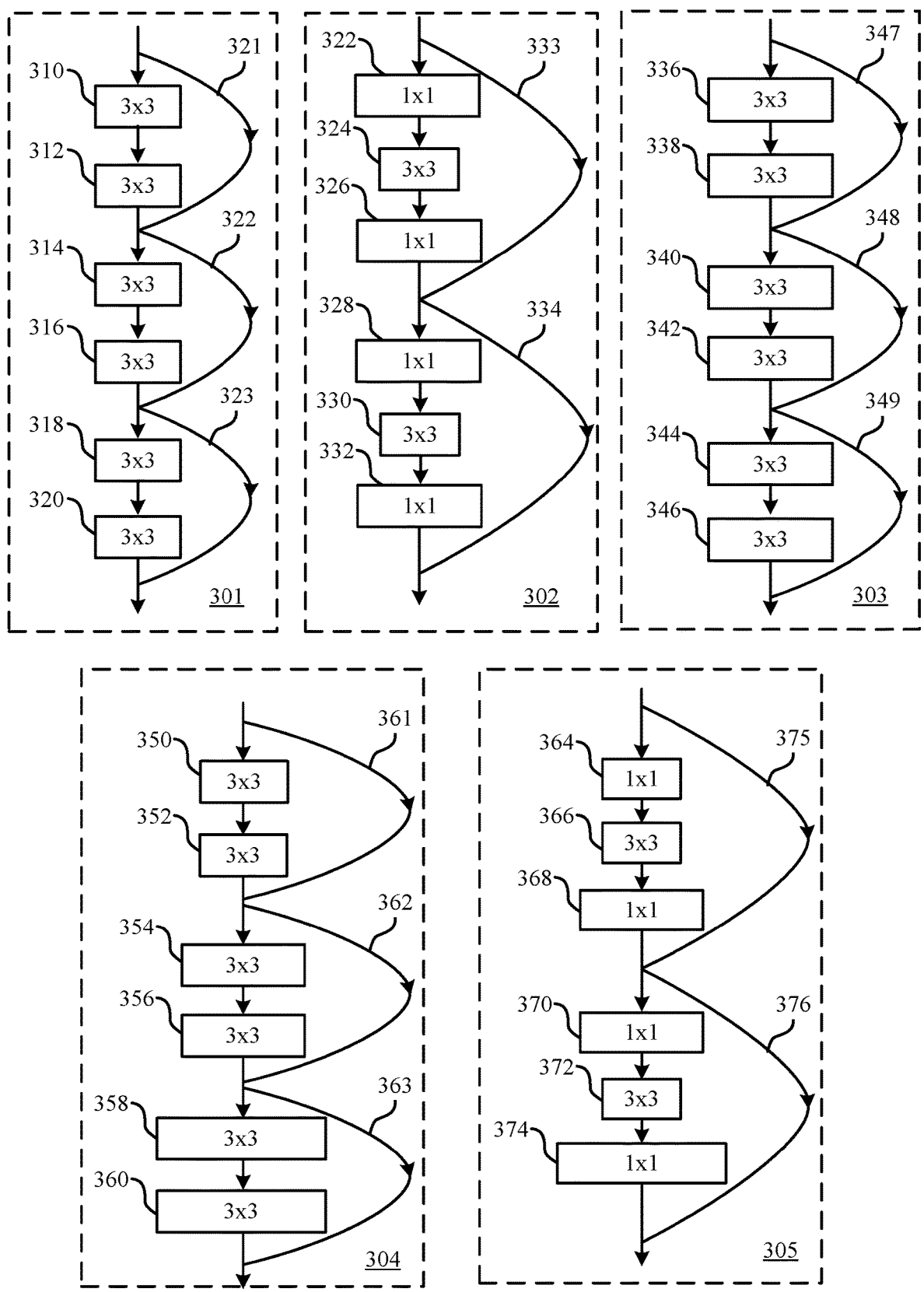
FIGS. 3 through 6 illustrate example implementations that support operations of a machine learning network in accordance with aspects of the present disclosure.

FIG. 3 illustrates example implementations 300 that support operations of a machine learning network in accordance with aspects of the present disclosure. In some examples, the implementations 300 may implement aspects of the system 100 as described in FIG. 1. The implementations 300 may include example building blocks of machine learning components (e.g., convolutional neural networks) implemented in some devices. For example, the illustrated building blocks may include a basic-type building block 301, a bottleneck-type building block 302, a wide-type building block 303, a pyramidal-type building block 304, and a pyramidal bottleneck-type building block 305.

The basic-type building block 301 may include, for example, 3×3 convolutional layers 310 through 320 and shortcut paths 321 through 323. The bottleneck-type building block 302 may include, for example, 1×1 convolutional layers 322, 326, 328, and 332, 3×3 convolutional layers 324 and 330, and shortcut paths 333 and 334. The wide-type building block 303 may include, for example, 3×3 convolutional layers 336 through 346 and shortcut paths 347 through 349. The pyramidal-type building block 304 may include, for example, 3×3 convolutional layers 350 through 360 and shortcut paths 361 through 363. The pyramidal bottleneck-type building block 305 may include, for example, 1×1 convolutional layers 364, 368, and 374, 3×3 convolutional layers 366 and 372, and shortcut paths 375 and 376.

Among building blocks with shortcut paths, for example, mixed dimensions (e.g., in terms of number of channels) across layers on a main path may affect intermediate feature expressiveness. For example, rates of "expansion" (e.g., going from narrower to wider layers) and "projection" (e.g., going from wider to narrower layers) may affect achievable accuracy or error performance of a machine learning network such as a convolutional neural network. Examples of machine learning networks may include residual neural networks such as ResNet (e.g., where neural networks in the ResNET family may have an expansion ratio of 4) and ResNeXt (e.g., where neural networks in the ResNeXt family may have an expansion ratio of up to 64) are described herein.

In some machine learning networks (e.g., convolutional neural networks) having bottleneck building blocks with shortcut connections, operations of the machine learning networks may include buffering constraints associated with the operations. For example, after some machine learning networks are trained, the machine learning networks may deploy deep learning inference operations which may classify, recognize, and process new inputs so as to optimize operations of the machine learning networks (e.g., reduce latency). Operations such as deep learning inference operations may include buffering constraints (e.g., in terms of the number of memory transactions) to support different levels or types of synchronization for features (e.g., operations) joining from multiple paths. In such examples, joining operations may affect intermediate memory (e.g., size) constraints. Examples of more advanced building blocks compared to some building blocks are described with respect to FIGS. 4 and 5.

Figure 4:
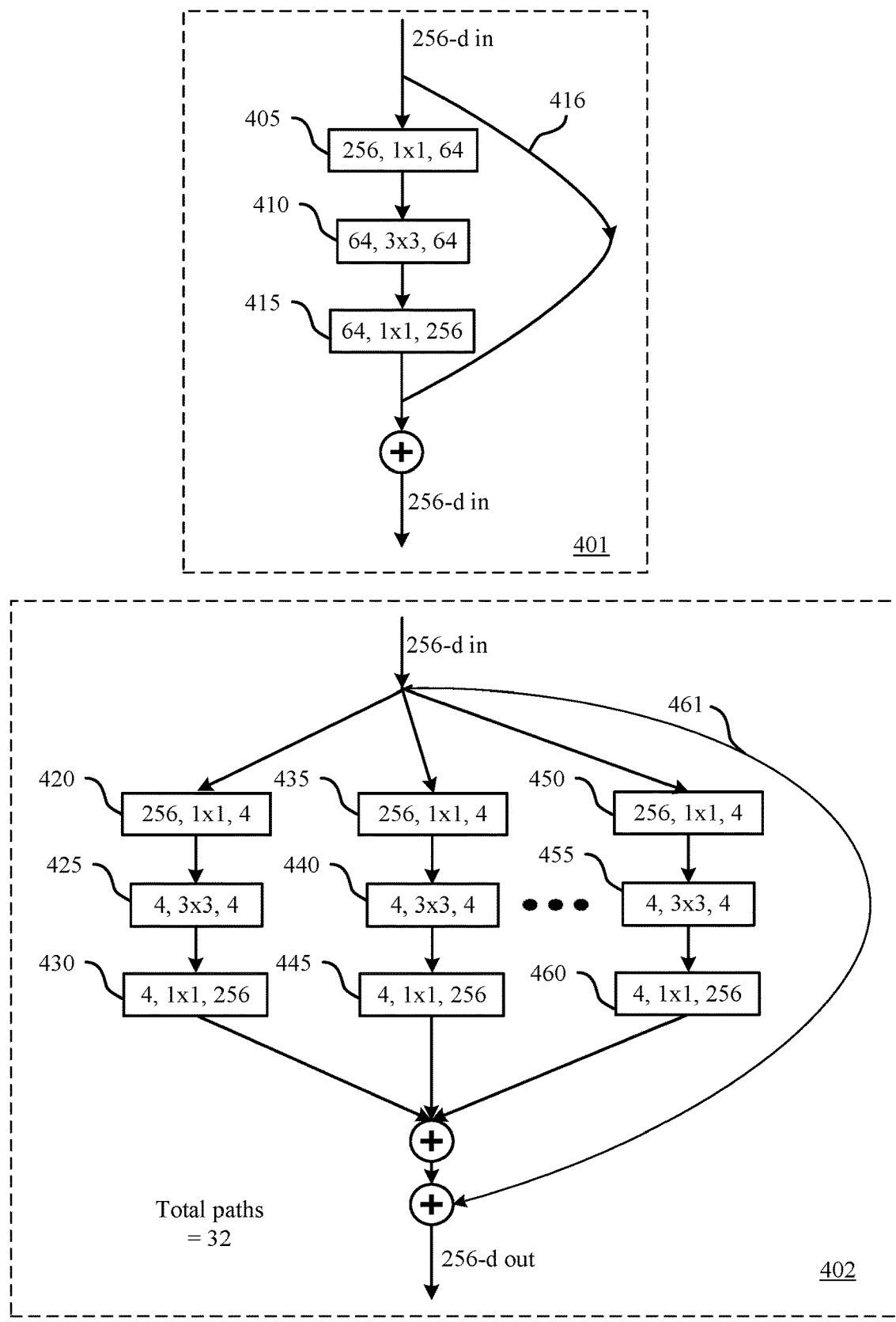

FIG. 4 illustrates example implementations 400 that support operations of a machine learning network in accordance with aspects of the present disclosure. In some examples, the implementations 400 may implement aspects of the system 100. The implementations 400 may include example building blocks of machine learning components (e.g., convolutional neural networks) implemented in some devices. For example, the illustrated building blocks include a ResNet-type building block 401 and a ResNeXt-type building block 402. The ResNet-type building block 401 may include, for example, convolutional layers 405 through 415 and a shortcut path 416. The ResNeXt-type building block 402 may include, for example, one or more convolutional layers 420 through 460 and a shortcut path 461. The ResNeXt-type building block 402 may have a cardinality of 32, with a complexity similar or roughly the same as that of the ResNet-type building block 401. The ResNeXt-type building block 402 may illustrate an example of aggregated residual transformations. Each of the convolutional layers illustrated herein is described using a number of input channels, a filter size, and a number of output channels (e.g., the convolutional layer 405 has 256 input channels, a filter size of 1×1, and 64 output channels).

Figure 5:
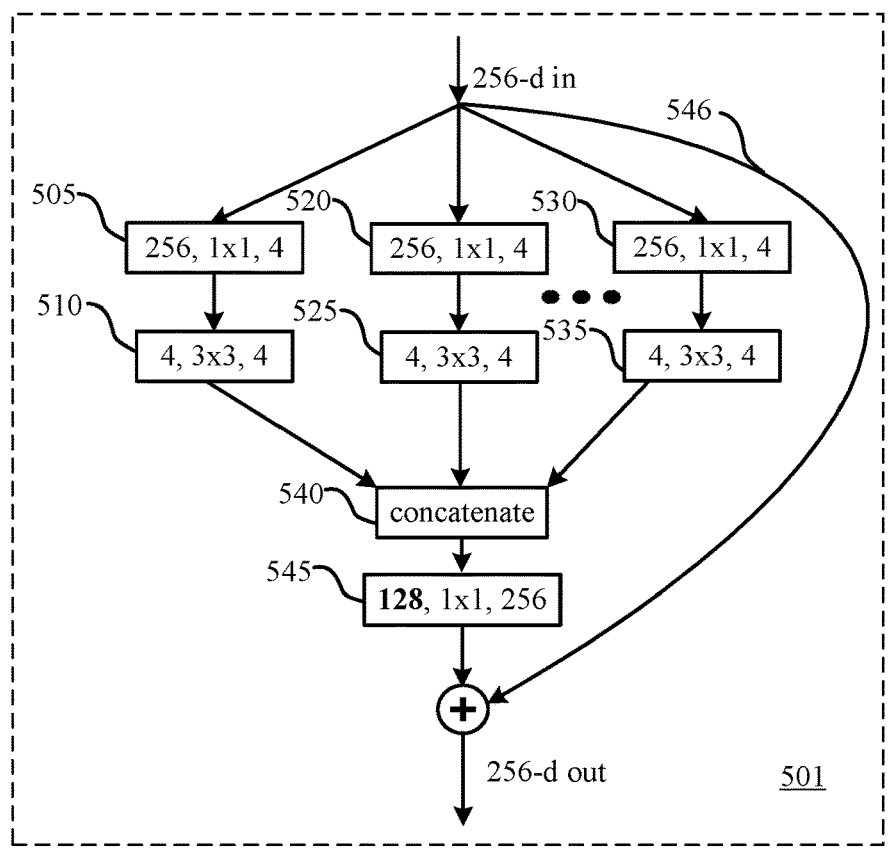
Figure 5:
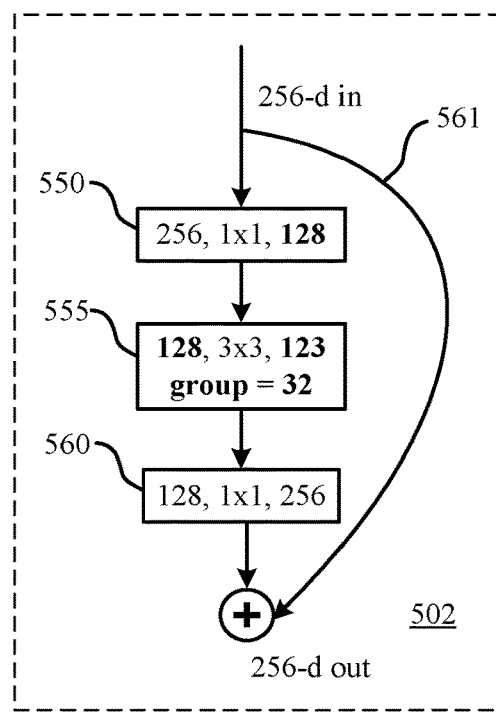

FIG. 5 illustrates example implementations 500 that support operations of a machine learning network in accordance with aspects of the present disclosure. In some examples, the implementations 500 may implement aspects of the system 100. The implementations 500 may include example building blocks of machine learning components (e.g., machine learning networks, for example, neural networks, deep neural networks, convolutional neural networks) implemented in some devices. For example, the illustrated building blocks may include one or more ResNeXt-type building blocks 501 and 502. The ResNeXt-type building block 501 may include, for example, one or more convolutional layers 505 through 535, a concatenation layer 540, a convolutional layer 545, and a shortcut path 546. The ResNeXt-type building block 502 may include, for example, one or more convolutional layers 550 through 560 and a shortcut path 561. Each of the convolutional layers illustrated herein may be described using a number of input channels, a filter size, and a number of output channels.

The ResNeXt-type building block 501 may be a block equivalent of the ResNeXt-type building block 402 illustrated in FIG. 4, implemented for example as early concatenation (e.g., the outputs at convolutional layers 510, 525, and 535 may be concatenated with a dimension of 128, and the convolutional layer 545 may restore the dimensions to 256). The ResNeXt-type building block 502 may be a block equivalent of the ResNeXt-type building block 501 and the ResNeXt-type building block 402 illustrated in FIG. 4, implemented for example as grouped convolutions.

Figure 6:
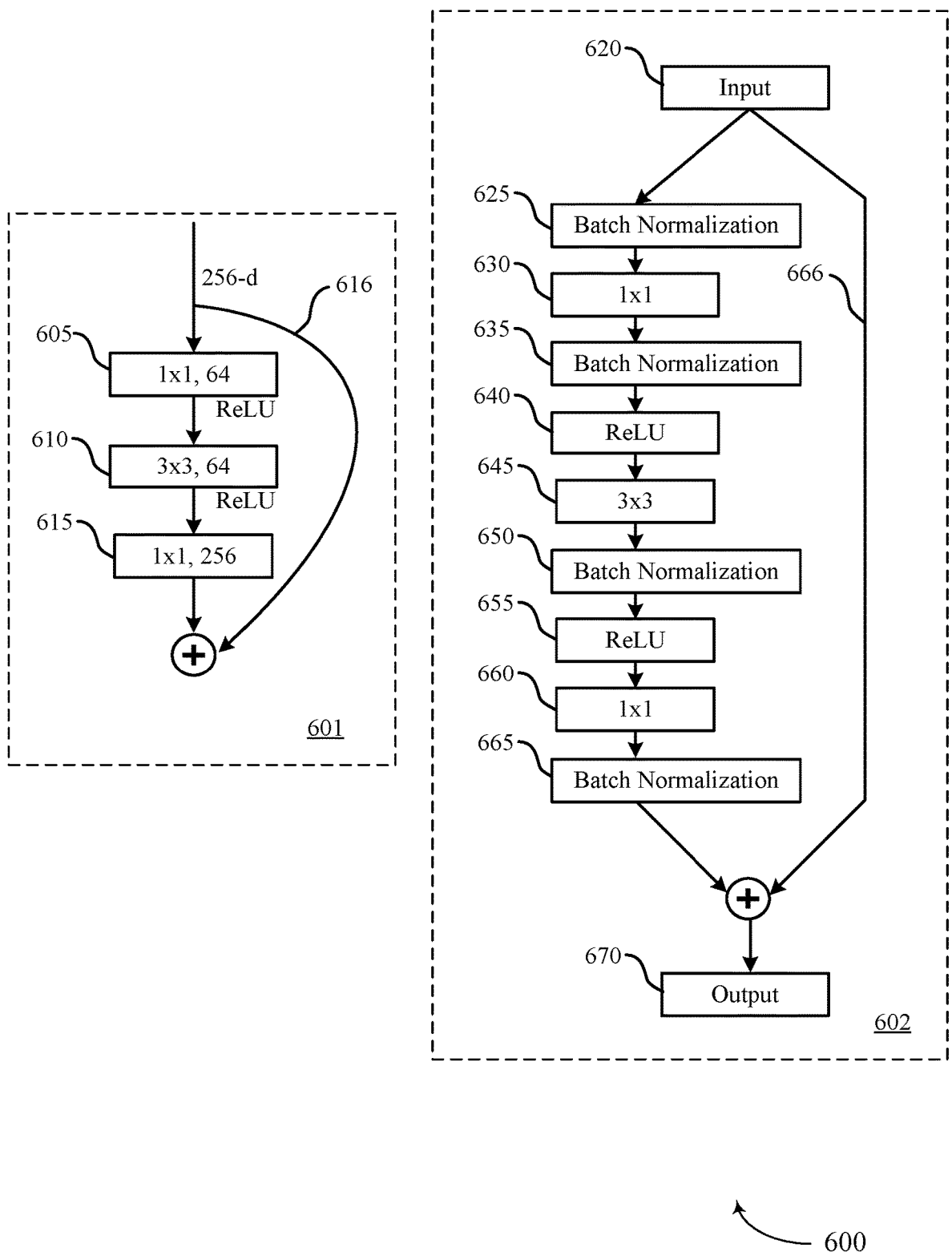

FIG. 6 illustrates example implementations 600 that support operations of a machine learning network in accordance with aspects of the present disclosure. In some examples, the implementations 600 may implement aspects of the system 100. The implementations 600 may include example building blocks of machine learning components (e.g., machine learning networks, for example, neural networks, deep neural networks, convolutional neural networks) implemented in some devices. For example, the illustrated building blocks include an example residual block 601 and a residual block 602. The residual block 601 may include, for example, one or more convolutional layers 605 through 615 and a shortcut path 616.

The residual block 602 may include, for example, an input 620, one or more batch normalization ('BatchNorm') blocks 625, 635, 650, and 665, one or more convolutional layers 630, 645, and 660, one or more rectified linear units (ReLUs) 640 and 655, a shortcut path 666, and an output 670. The batch normalization blocks 625, 635, 650, and 665 may include normalization functions that may normalize (e.g., adjust or fix) the means and variances of the inputs of convolutional layers 630, 645, and 660 based on changes to the convolutional layers 630, 645, and 660 due to training of an associated machine learning network. The ReLUs 640 and 655 may each include a piecewise linear function (e.g., rectified linear activation function) that may directly output an input if the input is positive and, otherwise, output a zero.

Referring to the residual block 601, with an expansion ratio of 4, the convolutional layer 605 may receive 256 input channels and produce 64 output channels, the convolutional layer 610 may receive 64 input channels and produce 64 output channels, and the convolutional layer 615 may receive 64 input channels and produce 256 output channels. For the residual block 601, a memory buffer may be implemented prior to summation at '+' to join features of the path through the convolutional layers 605 through 615 and features of the shortcut path 616. In an example case where the shortcut path 616 involves increased channels (e.g., an increased number of channels), the shortcut path 616 may be implemented with zero padding (e.g., zero buffering). In some examples, batch normalization may also be incorporated with respect to some of the convolutional layers 605 through 615.

According to examples of aspects described herein, the structure of a residual block with a shortcut connection (e.g., the residual block 601 with the shortcut path 616, the residual block 602 with the shortcut path 666) may create an alternative path from the beginning (e.g., an input layer, for example, the input 620 of the residual block 602) to the end (e.g., an output layer, for example, the output 670 of the residual block 602) of the block. In some example cases, the block may (e.g., the residual block 601, the residual block 602) use the alternative path when the network (e.g., the machine learning components 150 and 210) may benefit from additional features propagation. In some examples, a residual block may converge faster using a shortcut path than without the shortcut path, especially for example when the shortcut path is an identity function. In an example where the shortcut path 616 and the shortcut path 666 are identity functions, the residual block 601 may converge faster using the shortcut path 616 than without the shortcut path 616, and the residual block 602 may converge faster using the shortcut path 666 than without the shortcut path 666. Equations (1) and (2) provided herein respectively may express a residual block and a shortcut path (e.g., an identity shortcut).

$$\text{Residual block: } h(x) = f(x) + g(x) \quad (1)$$

$$\text{Identity shortcut } (g(x) = x): h(x) = f(x) + x \quad (2)$$

In some examples, h(x) may be a residual function, f(x) may represent a stacked non-linear layer, and x may represent an identity function (e.g., input=output).

An example of formulating the residual block 602 is described herein. In an example, the previous example for a residual block of sequential operations (e.g., Equation (1)) may be expressed as Equation (3) herein:

$$R_{1,3,1}^{4 \to 1 \to 4} \triangleq C_{1\times1}^{4 \to 1} \to C_{3\times3}^{1 \to 1} \to C_{1\times1}^{4 \to 4} \quad (3)$$

Using the building block of $R_{1,3,1}^{4 \to 1 \to 4}$, building a sub network of 3× layers (e.g., three (3) times the size (e.g., width, number of channels) of intermediate layers with respect to the building block) may be expressed as Equation (4) herein:

$$\text{SubNet}_{(3\times)}^{4 \to 1 \to 4} = R_{1,3,1;(0)}^{4 \to 1 \to 4} \to R_{1,3,1;(1)}^{4 \to 1 \to 4} \to \ldots \to R_{1,3,1;(X-1)}^{4 \to 1 \to 4} \quad (4)$$

In the example, shortcut paths of 4× width (e.g., for number of channels) may be used to connect the beginning and end of each $R_{1,3,1;(x)}^{4 \to 1 \to 4}$. In some examples, possible activations (e.g., ReLUs) and batch normalizations may be absorbed into convolution layers associated therewith, and representations of pooling operations in one or more of the shortcut paths may be omitted.

According to examples of aspects herein, $\text{SubNet}_{(3\times)}^{4 \to 1 \to 4}$ may further be expressed as Equation (5) herein:

$$\text{SubNet}_{(3X)}^{4 \to 1 \to 4} = \quad (5)$$

$$(C_{1\times1}^{4 \to 1} \to C_{3\times3}^{1 \to 1} \to C_{1\times1}^{1 \to 4}) \to \cdots \to (C_{1\times1}^{4 \to 1} \to C_{3\times3}^{1 \to 1} \to C_{1\times1}^{1 \to 4}) =$$

-continued
$$C_{1\times1}^{4 \to 1} \to (C_{3\times3}^{1 \to 1} \to C_{1\times1}^{1 \to 4} \to C_{1\times1}^{4 \to 1}) \to$$
$$\cdots \to (C_{3\times3}^{1 \to 1} \to C_{1\times1}^{1 \to 4} \to C_{1\times1}^{4 \to 1}) \to C_{3\times3}^{1 \to 1} \to C_{1\times1}^{1 \to 4}$$

Defining $R_{3,1,1}^{1 \to 4 \to 1} \triangleq C_{3\times3}^{1 \to 1} \to C_{1\times1}^{1 \to 4} \to C_{1\times1}^{4 \to 1}$, Eq. (5) may be rewritten as Equation (6) herein:

$$\text{SUbNet}_{(3\times)}^{4 \to 1 \to 4} = C_{1\times1}^{4 \to 1} \to R_{3,1,1;(0)}^{1 \to 4 \to 1} \to$$
$$R_{3,1,1;(1)}^{1 \to 4 \to 1} \to \ldots \to R_{3,1,1;(X-2)}^{1 \to 4 \to 1} \to$$
$$C_{3\times3}^{1 \to 1} \to C_{1\times1}^{1 \to 4} \quad (6)$$

In some examples, Equation (5) may similarly be rewritten as Equation (7) herein:

$$\text{SubNet}_{(3\times)}^{4 \to 1 \to 4} = C_{1\times1}^{4 \to 1} \to C_{3\times3}^{1 \to 1} \to$$
$$R_{1,1,3;(0)}^{1 \to 4 \to 1} \to R_{1,1,3;(1)}^{1 \to 4 \to 1} \to \ldots \to$$
$$R_{1,1,3;(X-2)}^{1 \to 4 \to 1} \to C_{1\times1}^{1 \to 4} \quad (7)$$

In Equations (5), (6), and (7), a shortcut path may always be present. For example, a shortcut path may connect the beginning (e.g., an input layer) and the end (e.g., an output layer) of each of $R_{1,3,1;(x)}^{4 \to 1 \to 4}$, $R_{3,1,1;(x)}^{1 \to 4 \to 1}$, and $R_{1,1,3;(x)}^{1 \to 4 \to 1}$. In an example, the shortcut path for $R_{1,3,1;(x)}^{4 \to 1 \to 4}$ may have a width of 4× (e.g., number of channels), while the shortcut paths for $R_{1,3,1;(x)}^{1 \to 4 \to 1}$ and $R_{3,1,1;(x)}^{1 \to 4 \to 1}$ may each have a width of 1× when the expansion ratio is 4 for each of $R_{1,3,1;(x)}^{4 \to 1 \to 4}$, $R_{3,1,1;(x)}^{1 \to 4 \to 1}$, and $R_{1,1,3;(x)}^{1 \to 4 \to 1}$.

Accordingly, for example, the activation memory buffer for each "R" building block of $R_{3,1,1;(x)}^{1 \to 4 \to 1}$ and $R_{1,1,3;(x)}^{1 \to 4 \to 1}$ may be designed to hold no more than 1× intermediate features, as opposed to 4× intermediate features for $R_{1,3,1;(x)}^{4 \to 1 \to 4}$. The activation buffer may be reusable from one "R" block to the next, as the shortcut paths may connect within each "R" block, and not across multiple "R" blocks. The residual block 602 of FIG. 6 illustrates aspects of operation details of $R_{1,3,1;(x)}^{4 \to 1 \to 4}$.

Aspects of intermediate memory efficiency are described herein. Given a directed acyclic compute hypergraph G consisting of edges representing operations and nodes with tensors of intermediate computation. The computation is scheduled to minimize the total number of tensors (e.g., vectors, scalars, n-dimensional arrays or lists) for storage in memory. In a general example, all plausible computation orders Σ(G) may be searched and the minima may be selected according to Equation (8) herein:

$$M(G) = \min_{\pi \in \Sigma(G)} \max_{i \in 1 \ldots n} \left[ \sum_{A \in R(i,\pi,G)} |A| \right] + \text{size}(\pi_i) \quad (8)$$

In Equation (8), R(i,π,G) may represent the list of operation (e.g., intermediate) tensors connected to any of a set of nodes $\pi_i \ldots \pi_n$, |A| may represent the size of a tensor A in operation, and size($\pi_i$) may represent the total amount of memory needed (e.g., a memory block allocation) for internal storage for operation i.

In an example case of a convolutional neural network with bottleneck modules, the maximum operation (e.g., intermediate) memories among $R_{1,3,1;(x)}^{4 \to 1 \to 4}$, $R_{3,1,1;(x)}^{1 \to 4 \to 1}$, and $R_{1,1,3;(x)}^{1 \to 4 \to 1}$ may vary by a factor of the expansion ratio, where the expansion ratio is 4 for typical ResNets and PyramidNets, 6 for MobileNetV2, and up to 64 for ResNeXt.

Referring back to Equations (1) and (2) regarding a residual block with an identity shortcut (e.g., h(x)=f(x)+x), the operations of the complete chain of main paths may be identical among Equations (5), (6), and (7). In other words, simply the "x" connections of the overall operations may be different among Equations (5), (6), and (7).

According to examples of aspects described herein, in view of the equality of the main path operations among Equations (5), (6), and (7), the techniques proposed herein may provide an architecture including switches at selected convolution layers, where the switches may be switched ON/OFF. For example, in supporting network operations with $R_{1,3,1;(x)}^{4 \to 1 \to 4}$, examples of aspects described herein may include features for turning ON a subset of switches so as to enable or connect the shortcut path between the beginning and end (e.g., head and tail) of $R_{1,3,1;(x)}^{4 \to 1 \to 4}$. In some examples, in supporting network operations with $R_{3,1,1;(x)}^{1 \to 4 \to 1}$, examples of aspects described herein may include features for turning ON a subset of switches so as to enable or connect the shortcut path between the beginning and end (e.g., the head and tail) of $R_{3,1,1;(x)}^{1 \to 4 \to 1}$.

According to examples of aspects described herein, the techniques proposed herein may also support switchable sub-operations of modules (e.g., bottleneck modules, modules $R_{1,3,1;(x)}^{4 \to 1 \to 4}$, $R_{3,1,1;(x)}^{1 \to 4 \to 1}$, and $R_{1,1,3;(x)}^{1 \to 4 \to 1}$) with reusability of the same module engine to support variations of operations. For example, considering modules $R_{1,3,1;(x)}^{4 \to 1 \to 4}$, $R_{3,1,1;(x)}^{1 \to 4 \to 1}$, and $R_{1,1,3;(x)}^{1 \to 4 \to 1}$, the absolute equivalent execution sequences of the modules may be the same based on stacking the "R" modules (e.g., $\ldots \to C_{1 \times 1}^{4 \to 1} \to C_{3 \times 3}^{1 \to 1} \to C_{1 \times 1}^{1 \to 4} \to \ldots$), and accordingly, the techniques proposed herein may support reuse of the same "engine core" to cover sub-operations of "R" modules by switching ON/OFF a subset of the internal operations within each module.

For example, the techniques proposed herein may provide improvements over implementing the exact forms of each of the multiple variants of the "R" modules $R_{1,3,1;(x)}^{4 \to 1 \to 4}$, $R_{3,1,1;(x)}^{1 \to 4 \to 1}$, and $R_{1,1,3;(x)}^{1 \to 4 \to 1}$. In some examples, the techniques proposed herein may support implementing a first variant from among the "R" modules $R_{1,3,1;(x)}^{4 \to 1 \to 1}$, $R_{3,1,1;(x)}^{1 \to 1 \to 1}$, and $R_{1,1,3;(x)}^{1 \to 4 \to 1}$ (e.g., $R_{1,3,1;(x)}^{4 \to 1 \to 4}$) and then executing sub-operations equivalent to the remaining variants (e.g., $R_{3,1,1;(x)}^{1 \to 4 \to 1}$ and $R_{1,1,3;(x)}^{1 \to 4 \to 1}$) by switching ON/OFF one or more sub-operations inside the "R" module of the first variant. The concept described herein may be applied also to the first and last iterations of the "R" module execution.

Aspects of the subject matter described herein may be implemented to realize one or more advantages. The described techniques may benefit ultra-low power sensor applications, for example, applications which may perform classification tasks (e.g., image classification) for determining human presence (e.g., user identification, user tracking).

In an example, the described techniques may include determining, for an entirety or a subset of a machine learning network, that a metric (e.g., as derived from a subset of features) is below (or above, depending on design details) a metric threshold or fails a logical condition. In some examples, the described techniques may include setting switches such that $R_{3,1,1;(x)}^{1 \to 4 \to 1}$ shortcut connection is used (e.g., enabled, connected) to achieve a reduced (e.g., 1x) activation memory constraint (e.g., by shutting down remaining (e.g., 3x) activation memory blocks). Using the shortcut connection and shutting down the remaining activation memory blocks may significantly reduce activation data movement as well as operations, and significant power savings may be achieved. The described techniques may be applied to the majority or a significant portion of the time for neural network inferencing.

In another examples, the described techniques may include determining the metric is above (or below, depending on design details) the metric threshold or passes a logical condition. In some examples, the described techniques may include setting switches such that $R_{1,3,1;(x)}^{4 \to 1 \to 4}$ shortcut connection is used (e.g., enabled, connected) to engage full (e.g., 4x) activation memory and achieve maximum accuracy performance.

The described techniques relate to an improved architecture capable of achieving maximum accuracy performance, while reducing average power consumption. In some examples, the logical switches may make up a relatively negligible portion of an overall machine learning network (e.g., neural network) size. In some examples, additional configurability with the metric threshold or logical condition as discussed herein may be implemented and modified based on accuracy-power performance.

Aspects of the subject matter described herein may be implemented in association with residual bottleneck blocks with shortcut connections in various convolutional neural network models (e.g., ResNet, ResNeXt, MobileNet, ShuffleNet, PyramidNet) for achieving increased accuracy performance. Additionally, aspects of the subject matter described herein may be implemented in energy-efficient design for ultra-low power applications, for example in Internet-of-Things (IoT)/Industrial IoT (IIoT) types of computer vision and sensor applications. In some examples, the techniques described herein may support a unified engine design (e.g., such as a unified residual bottleneck block) applicable to a wide range of use cases (e.g., applications of different accuracy or power consumption constraints), which may save in development or manufacturing costs. In some examples, the techniques described herein may support a wide range of applications related to computer vision and sensing operations (e.g., classification, object detection, change detection, semantic segmentation, object or human counting, among other examples). For example, different applications implemented on a same device (e.g., the device 115, the device 205) may re-use the portions of the same machine learning network (e.g., the machine learning component 150, the machine learning component 210, convolutional neural network) for performing tasks which may be associated with different accuracy or power consumption constraints.

Figure 7:
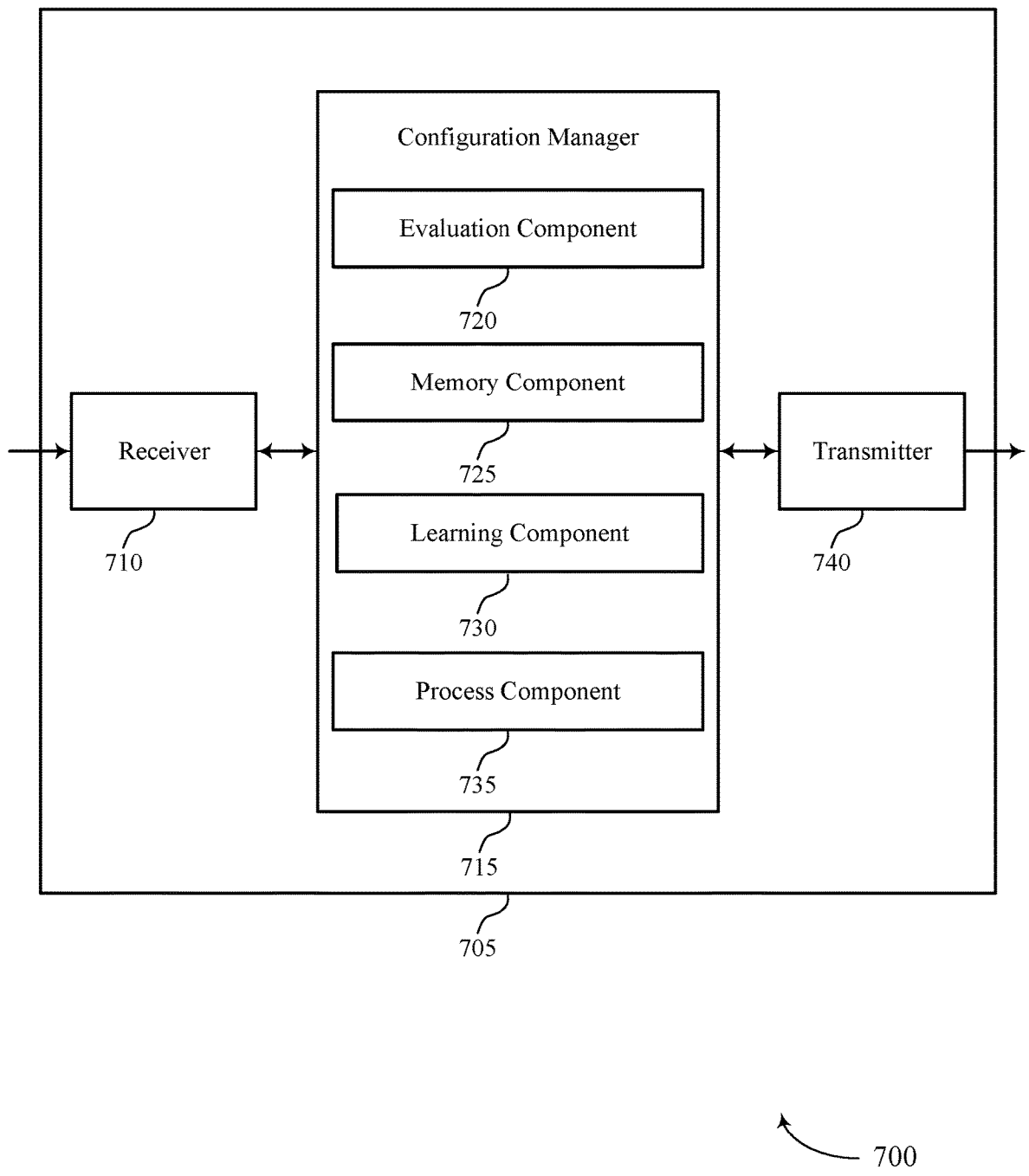
FIG. 7 illustrates a block diagram of a device that supports configuring a memory block allocation of a machine learning network in accordance with aspects of the present disclosure.

FIG. 7 shows a block diagram 700 of a device 705 that supports configuring a memory block allocation of a machine learning network in accordance with aspects of the present disclosure. The device 705 may be an example of aspects of a device 115 as described herein. The device 705 may include a receiver 710, a configuration manager 715, and a transmitter 740. Each of these components may be in communication with one another (e.g., via one or more buses).

The receiver 710 may receive information such as packets, user data, or control information associated with various information channels (e.g., control channels, data channels, and information related to method of configuring a memory block allocation of a machine learning network, etc.). Information may be passed on to other components of the device 705. The receiver 710 may be an example of aspects of the transceiver 820 described with reference to FIG. 8. The receiver 710 may utilize a single antenna or a set of antennas.

The configuration manager 715 may include an evaluation component 720, a memory component 725, a learning component 730, and a process component 735. The configuration manager 715 may be an example of aspects of the configuration manager 810 described herein.

The configuration manager 715 may identify a performance level associated with an application on the device 705, determine, based on identifying the performance level, that the performance level satisfies a condition, determine a memory block allocation of a machine learning network of the device 705 based on the performance level satisfying the condition, the memory block allocation corresponding to one or more connections of the machine learning network, adjust a quantity of memory blocks available for the machine learning network of the device 705 based on the memory block allocation, and process the application by the device 705 based on the memory block allocation.

The configuration manager 715 as described herein may be implemented to realize one or more potential advantages. One implementation may allow the device 705 to provide techniques which may support memory block allocation of a machine learning network, among other advantages. For example, the device 705 may include features for reducing processing time, complexity, memory usage, and power usage of the device 705, as the device 705 may configure a memory block allocation and modify a configuration for connections of a machine learning network based on a performance level of an application associated with the device 705.

The configuration manager 715, or its sub-components, may be implemented in hardware, code (e.g., software or firmware) executed by a processor, or any combination thereof. If implemented in code executed by a processor, the functions of the configuration manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The configuration manager 715, or its sub-components, may be physically located at various positions, including being distributed such that portions of functions are implemented at different physical locations by one or more physical components. In some examples, the configuration manager 715, or its sub-components, may be a separate and distinct component in accordance with various aspects of the present disclosure. In some examples, the configuration manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The evaluation component 720 may identify a performance level associated with an application on the device 705. In some examples, the evaluation component 720 may determine, based on identifying the performance level, that the performance level satisfies a condition. In some examples, the evaluation component 720 may determine that the performance level is below a performance threshold. In some examples, the evaluation component 720 may determine that the performance level is above a performance threshold. In some cases, the performance threshold may include one or more of an accuracy threshold level, a processing time threshold, a processing throughput threshold, a processing latency threshold, a memory usage threshold, or a power usage threshold. In some cases, the performance level includes one or more of an accuracy level, a processing time, a processing throughput, a processing latency, a memory usage, or a power usage.

The memory component 725 may determine a memory block allocation of a machine learning network of the device 705 based on the performance level satisfying the condition, the memory block allocation corresponding to one or more connections of the machine learning network. In some examples, the memory component 725 may adjust a quantity of memory blocks available for the machine learning network of the device 705 based on the memory block allocation. In some examples, the memory component 725 may toggle one or more memory blocks of the quantity of the memory blocks available for the machine learning network. In some examples, the memory component 725 may power ON the one or more memory blocks or power OFF the one or more memory blocks. In some examples, the memory component 725 may identify an expansion ratio associated with the machine learning network and adjust the quantity of the memory blocks available for the machine learning network based on the expansion ratio. In some cases, in adjusting the quantity of memory blocks available for the machine learning network, the memory component 725 may reduce the quantity of the memory blocks available for the machine learning network based on determining that the performance level is below the threshold. In some cases, the memory component 725 may increase the quantity of the memory blocks available for the machine learning network based on determining that the performance level is above the threshold.

The learning component 730 may modify a configuration for the one or more connections of the machine learning network based on the quantity of memory blocks, where processing the application by the device 705 may be based on the modified configuration. In some examples, the learning component 730 may configure one or more logical switches associated with the machine learning network based on the modified configuration. In some cases, the learning component 730 may select one or more paths of the machine learning network based on the modified configuration, where the one or more paths of the machine learning network are in connection with a residual memory block of the machine learning network. In some examples, the learning component 730 may configure one or more cross-layer identity connections associated with the machine learning network, where the one or more cross-layer identity connections may be associated with one or more of the memory blocks and the one or more connections of the machine learning network. In some cases, the learning component 730 may configure one or more weights associated with the machine learning network based on the modified configuration. The process component 735 may process the application by the device based on a memory block allocation, a configuration for one or more connections of the machine learning network, or both.

The transmitter 740 may transmit signals generated by other components of the device 705. In some examples, the transmitter 740 may be collocated with a receiver 710 in a transceiver module. For example, the transmitter 740 may be an example of aspects of the transceiver 820 described with reference to FIG. 8. The transmitter 740 may utilize a single antenna or a set of antennas.

Figure 8:
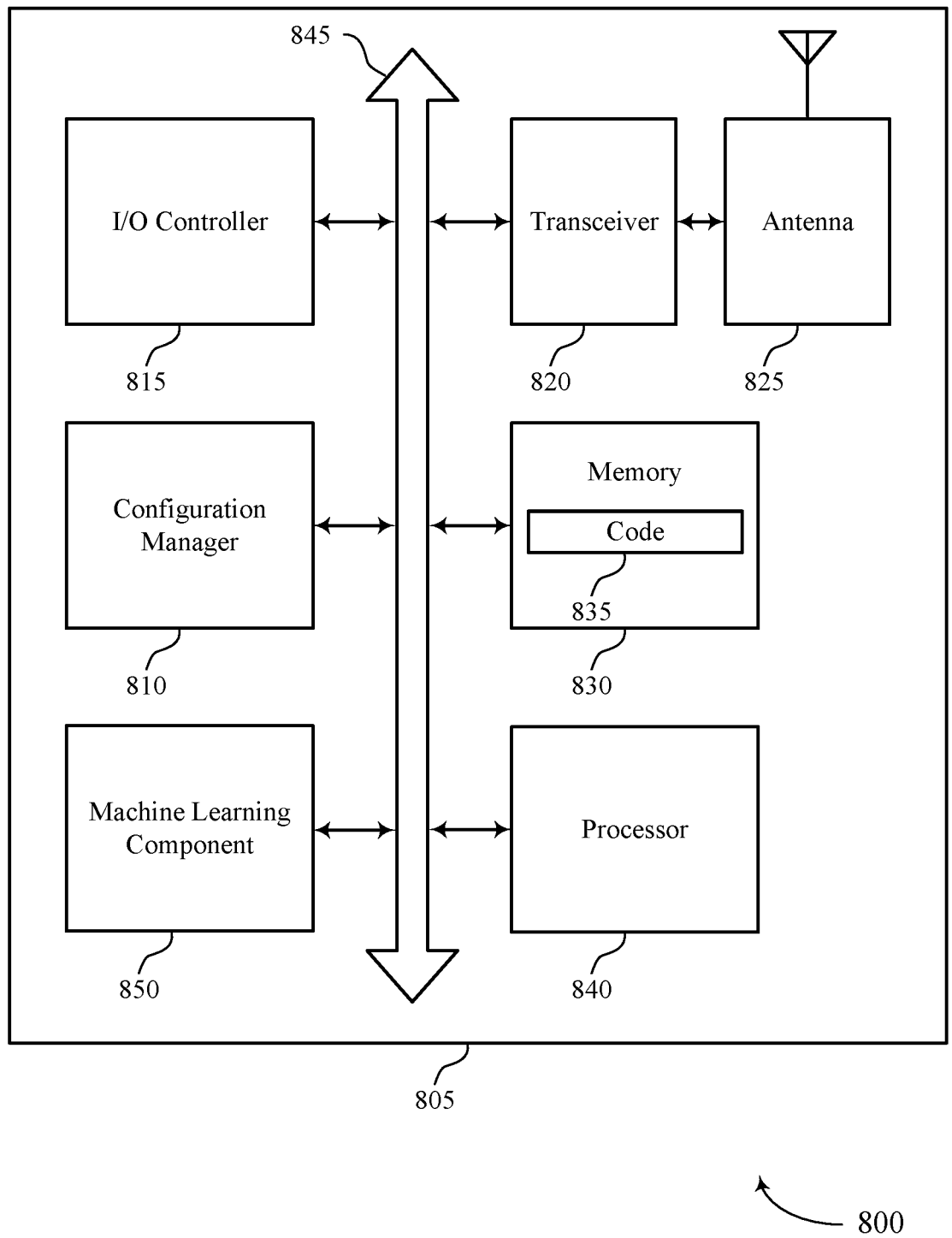
FIG. 8 illustrates a diagram of a system including a device that supports configuring a memory block allocation of a machine learning network in accordance with aspects of the present disclosure.

FIG. 8 shows a diagram of a system 800 including a device 805 that supports configuring a memory block allocation of a machine learning network in accordance with aspects of the present disclosure. The device 805 may be an example of or include the components of device 705, or a device as described herein. The device 805 may include components for bi-directional voice and data communications including components for transmitting and receiving communications, including a configuration manager 810, an I/O controller 815, a transceiver 820, an antenna 825, memory 830, a processor 840, and a machine learning component 850. These components may be in electronic communication via one or more buses (e.g., bus 845).

The configuration manager 810 may identify a performance level associated with an application on the device 805, determine, based on identifying the performance level, that the performance level satisfies a condition, determine a memory block allocation of a machine learning network of the device based on the performance level satisfying the condition, the memory block allocation corresponding to one or more connections of the machine learning network, adjust a quantity of memory blocks available for the machine learning network of the device 805 based on the memory block allocation, and process the application by the device 805 based on the memory block allocation. The configuration manager 810 may modify a configuration for the one or more connections of the machine learning network based on the quantity of memory blocks, and process the application by the device 805 may further be based on the modified configuration. In some examples, the configuration manager 810 may in combination with the machine learning component 850 perform one or more of the above operations. In some examples, the machine learning component 850 may include one or more of a neural network, a residual network, or a deep learning network.

The configuration manager 810 or one or more components of the configuration manager 810 described herein may perform and/or be a means for identifying a performance level associated with an application on the device 805. The configuration manager 810 or one or more components of the configuration manager 810 described herein may perform and/or be a means for determining, based on identifying the performance level, that the performance level satisfies a condition. The configuration manager 810 or one or more components of the configuration manager 810 described herein may perform and/or be a means for determining a memory block allocation of a machine learning network of the device 805 based on the performance level satisfying the condition, the memory block allocation corresponding to one or more connections of the machine learning network. The configuration manager 810 or one or more components of the configuration manager 810 described herein may perform and/or be a means for adjusting a quantity of memory blocks available for the machine learning network of the device 805 based on the memory block allocation. The configuration manager 810 or one or more components of the configuration manager 810 described herein may perform and/or be a means for processing the application by the device 805 based on the memory block allocation.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS, ANDROID, MS-DOS, MS-WINDOWS, OS/2, UNIX, LINUX, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver.

The transceiver 820 may also include a modem to modulate the packets and provide the modulated packets to the antennas for transmission, and to demodulate packets received from the antennas. In some cases, the device 805 may include a single antenna 825. However, in some cases the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting method of configuring a memory block allocation of a machine learning network).

The code 835 may include instructions to implement aspects of the present disclosure, including instructions to support configuring a machine learning network. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
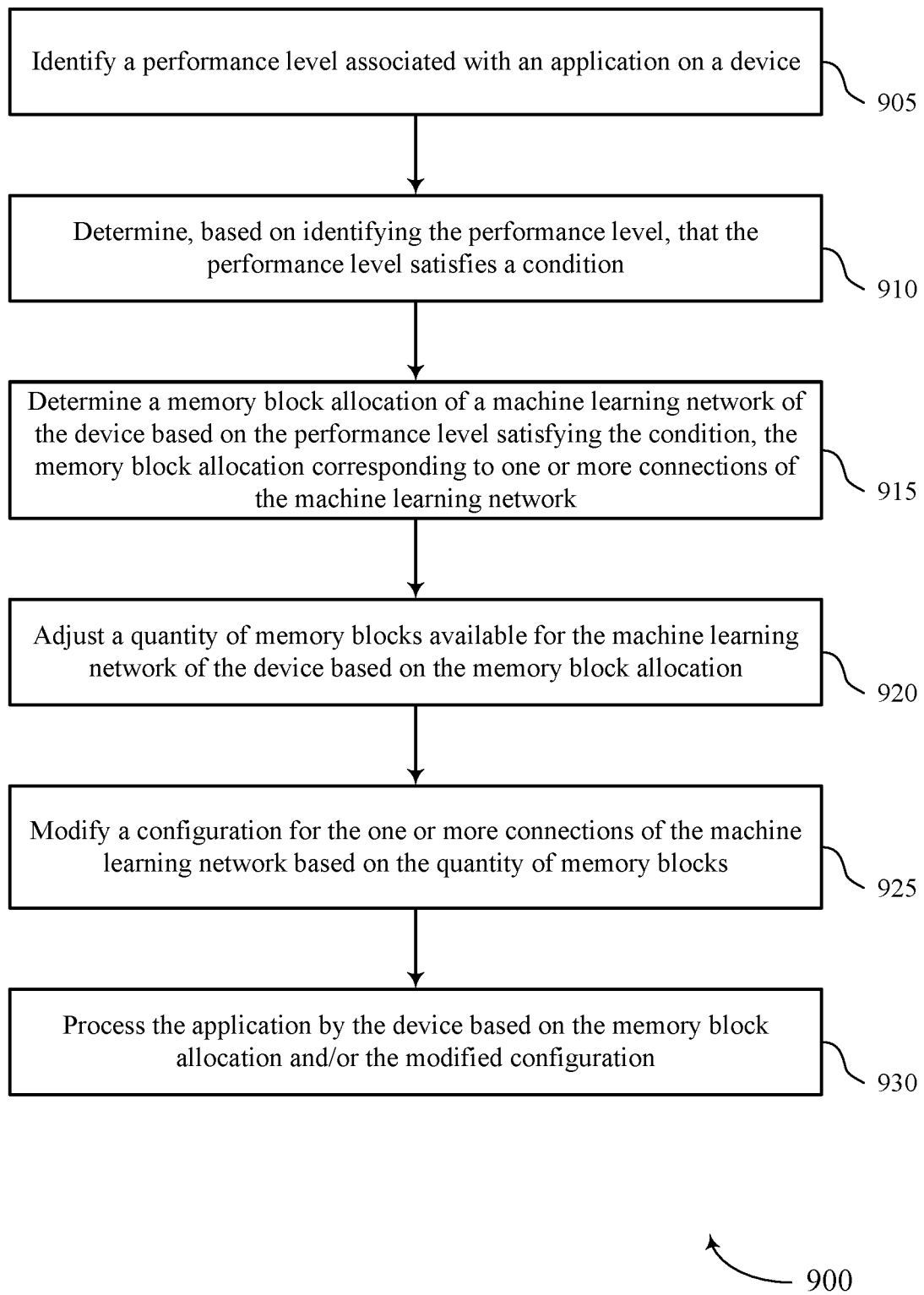
FIGS. 9 and 10 show flowcharts illustrating methods that support configuring a memory block allocation of a machine learning network in accordance with aspects of the present disclosure.

FIG. 9 shows a flowchart illustrating a method 900 that supports configuring a memory block allocation of a machine learning network in accordance with aspects of the present disclosure. The operations of method 900 may be implemented by a device or its components as described herein. For example, the operations of method 900 may be performed by a configuration manager as described with reference to FIGS. 7 and 8. In some examples, a device may execute a set of instructions to control the functional elements of the device to perform the functions described below. Additionally or alternatively, a device may perform aspects of the functions described below using special-purpose hardware.

At 905, the device may identify a performance level associated with an application on the device. The operations of 905 may be performed according to the methods described herein. In some examples, aspects of the operations of 905 may be performed by a performance evaluation component as described with reference to FIGS. 7 and 8.

At 910, the device may determine, based on identifying the performance level, that the performance level satisfies a condition. The operations of 910 may be performed according to the methods described herein. In some examples, aspects of the operations of 910 may be performed by a performance evaluation component as described with reference to FIGS. 7 and 8.

At 915, the device may determine a memory block allocation of a machine learning network of the device based on the performance level satisfying the condition, the memory block allocation corresponding to one or more connections of the machine learning network. The operations of 915 may be performed according to the methods described herein. In some examples, aspects of the operations of 915 may be performed by a memory manager as described with reference to FIGS. 7 and 8.

At 920, the device may adjust a quantity of memory blocks available for the machine learning network of the device based on the memory block allocation. The operations of 920 may be performed according to the methods described herein. In some examples, aspects of the operations of 920 may be performed by a memory manager as described with reference to FIGS. 7 and 8.

At 925, the device may modify a configuration for the one or more connections of the machine learning network based on the quantity of memory blocks. The operations of 925 may be performed according to the methods described herein. In some examples, aspects of the operations of 925 may be performed by a learning manager as described with reference to FIGS. 7 and 8.

At 930, the device may process the application by the device based on the memory block allocation, the modified configuration, or both. The operations of 930 may be performed according to the methods described herein. In some examples, aspects of the operations of 930 may be performed by a processor as described with reference to FIGS. 7 and 8.

Figure 10:
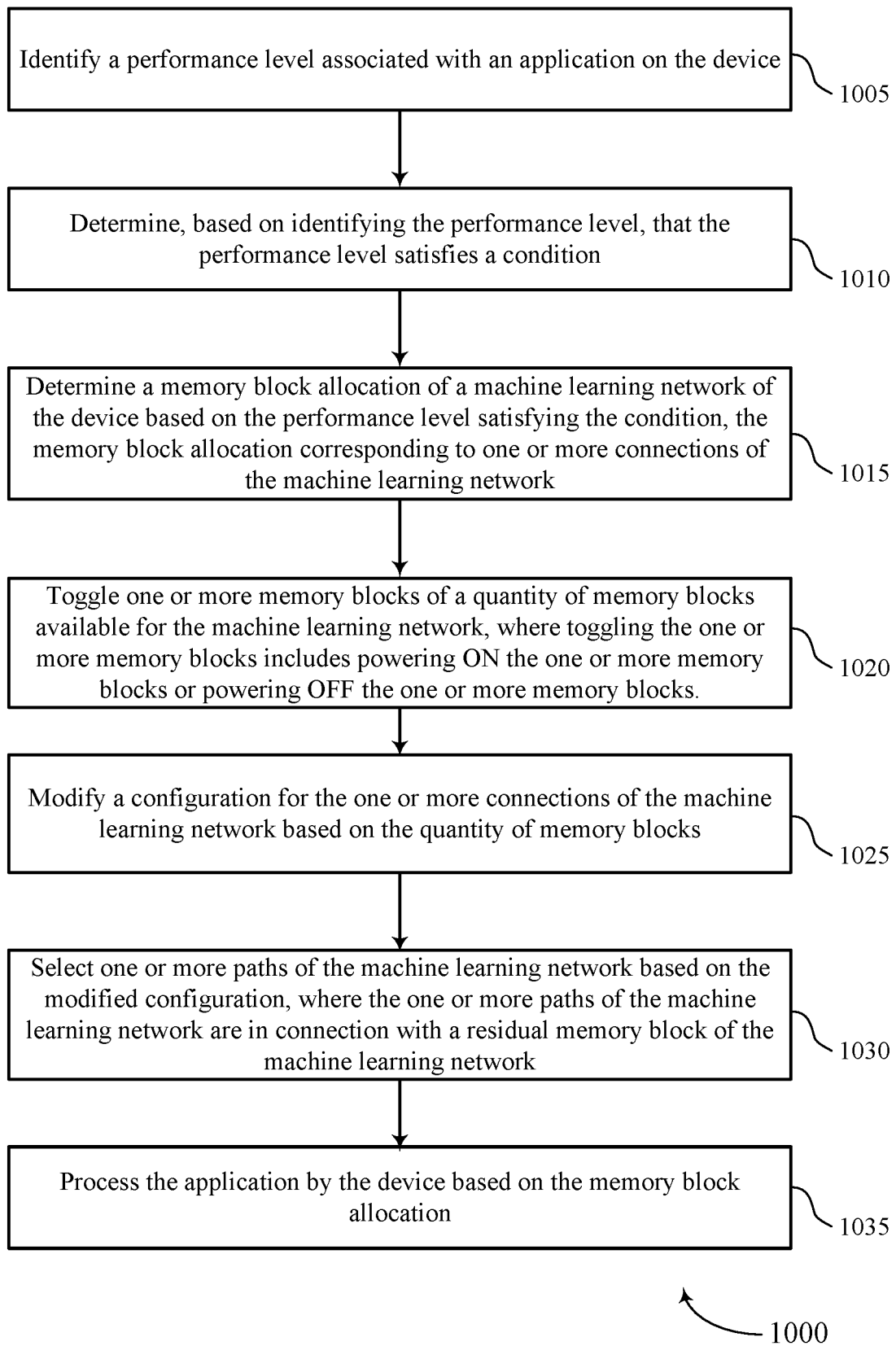

FIG. 10 shows a flowchart illustrating a method 1000 that supports configuring a memory block allocation of a machine learning network in accordance with aspects of the present disclosure. The operations of method 1000 may be implemented by a device or its components as described herein. For example, the operations of method 1000 may be performed by a configuration manager as described with reference to FIGS. 7 and 8. In some examples, a device may execute a set of instructions to control the functional elements of the device to perform the functions described below. Additionally or alternatively, a device may perform aspects of the functions described below using special-purpose hardware.

At 1005, the device may identify a performance level associated with an application on the device. The operations of 1005 may be performed according to the methods described herein. In some examples, aspects of the operations of 1005 may be performed by a performance evaluation component as described with reference to FIGS. 7 and 8.

At 1010, the device may determine, based on identifying the performance level, that the performance level satisfies a condition. The operations of 1010 may be performed according to the methods described herein. In some examples, aspects of the operations of 1010 may be performed by a performance evaluation component as described with reference to FIGS. 7 and 8.

At 1015, the device may determine a memory block allocation of a machine learning network of the device based on the performance level satisfying the condition, the memory block allocation corresponding to one or more connections of the machine learning network. The operations of 1015 may be performed according to the methods described herein. In some examples, aspects of the operations of 1015 may be performed by a memory manager as described with reference to FIGS. 7 and 8.

At 1020, the device may toggle one or more memory blocks of a quantity of memory blocks available for the machine learning network based on the memory block allocation, where toggling the one or more memory blocks may include powering ON the one or more memory blocks or powering OFF the one or more memory blocks. The operations of 1020 may be performed according to the methods described herein. In some examples, aspects of the operations of 1020 may be performed by a memory manager as described with reference to FIGS. 7 and 8.

At 1025, the device may modify a configuration for the one or more connections of the machine learning network based on the quantity of memory blocks. The operations of 1025 may be performed according to the methods described herein. In some examples, aspects of the operations of 1025 may be performed by a learning manager as described with reference to FIGS. 7 and 8.

At 1030, the device may select one or more paths of the machine learning network based on the modified configuration, where the one or more paths of the machine learning network may be in connection with a residual memory block of the machine learning network. The operations of 1030 may be performed according to the methods described herein. In some examples, aspects of the operations of 1030 may be performed by the learning manager as described with reference to FIGS. 7 and 8.

At 1035, the device may process the application by the device based on the memory block allocation, the modified configuration, or both. The operations of 1035 may be performed according to the methods described herein. In some examples, aspects of the operations of 1035 may be performed by a processor as described with reference to FIGS. 7 and 8.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
    identifying a performance level associated with an application on a device;
    determining, based at least in part on identifying the performance level, that the performance level satisfies a condition;
    determining a memory block allocation of a machine learning network of the device based at least in part on the performance level satisfying the condition, the memory block allocation corresponding to one or more connections of the machine learning network;
    adjusting a quantity of memory blocks available for the machine learning network of the device based at least in part on the memory block allocation, the machine learning network comprising one or more cross-layer identity connections, each cross-layer identity connection of the one or more cross-layer identity connections including an identity function; and
    processing the application by the device including bypassing one or more intermediate layers of the machine learning network using the one or more cross-layer identity connections based at least in part on the adjusted quantity of memory blocks available for the machine learning network.

2. The method of claim 1, further comprising:
    modifying a configuration for the one or more connections of the machine learning network based at least in part on the quantity of memory blocks, wherein processing the application by the device is based at least in part on the modified configuration.

3. The method of claim 2, wherein modifying the configuration comprises:
    configuring one or more logical switches associated with the machine learning network based at least in part on the modified configuration.

4. The method of claim 2, wherein modifying the configuration comprises:
    selecting one or more paths of the machine learning network based at least in part on the modified configuration, wherein the one or more paths of the machine learning network are in connection with a residual memory block of the machine learning network.

5. The method of claim 2, wherein modifying the configuration comprises:

configuring the one or more cross-layer identity connections associated with the machine learning network based at least in part on the modified configuration, wherein the one or more cross-layer identity connections are associated with one or more of the memory blocks and the one or more connections of the machine learning network.

6. The method of claim 2, wherein modifying the configuration comprises:

configuring one or more weights associated with the machine learning network based at least in part on the modified configuration.

7. The method of claim 1, wherein determining that the performance level satisfies the condition comprises:

determining that the performance level is below a performance threshold, wherein adjusting the quantity of memory blocks available for the machine learning network comprises:

reducing the quantity of the memory blocks available for the machine learning network based at least in part on determining that the performance level is below the performance threshold.

8. The method of claim 7, wherein the performance threshold comprises one or more of an accuracy threshold level, a processing time threshold, a processing throughput threshold, a processing latency threshold, a memory usage threshold, or a power usage threshold.

9. The method of claim 1, wherein determining that the performance level satisfies the condition comprises:

determining that the performance level is above a performance threshold, wherein adjusting the quantity of memory blocks available for the machine learning network comprises:

increasing the quantity of the memory blocks available for the machine learning network based at least in part on determining that the performance level is above the performance threshold.

10. The method of claim 1, wherein adjusting the quantity of the memory blocks available for the machine learning network comprises:

toggling one or more memory blocks of the quantity of the memory blocks available for the machine learning network, wherein toggling the one or more memory blocks comprises powering ON the one or more memory blocks or powering OFF the one or more memory blocks.

11. The method of claim 1, further comprising:

identifying an expansion ratio associated with the machine learning network, the expansion ratio corresponding to a number of channels across a set of layers of the machine learning network, wherein adjusting the quantity of the memory blocks available for the machine learning network is based at least in part on the expansion ratio.

12. The method of claim 1, wherein the performance level comprises one or more of an accuracy level, a processing time, a processing throughput, a processing latency, a memory usage, or a power usage.

13. The method of claim 1, wherein the machine learning network comprises one or more of a neural network, a residual network, or a deep learning network.

14. An apparatus comprising:

a processor;

memory coupled with the processor; and instructions stored in the memory and executable by the processor to cause the apparatus to:

identify a performance level associated with an application on the apparatus;

determine, based at least in part on identifying the performance level, that the performance level satisfies a condition;

determine a memory block allocation of a machine learning network of the apparatus based at least in part on the performance level satisfying the condition, the memory block allocation corresponding to one or more connections of the machine learning network, the machine learning network comprising one or more cross-layer identity connections, each cross-layer identity connection of the one or more cross-layer identity connections including an identity function;

adjust a quantity of memory blocks available for the machine learning network of the apparatus based at least in part on the memory block allocation; and process the application by the apparatus including bypass one or more intermediate layers of the machine learning network using the one or more cross-layer identity connections based at least in part on the adjusted quantity of memory blocks available for the machine learning network.

15. The apparatus of claim 14, wherein the instructions are further executable by the processor to cause the apparatus to:

modify a configuration for the one or more connections of the machine learning network based at least in part on the quantity of memory blocks, wherein the instructions to process the application by the apparatus are further executable by the processor based at least in part on the modified configuration.

16. The apparatus of claim 15, wherein the instructions to modify the configuration are executable by the processor to cause the apparatus to:

configure one or more logical switches associated with the machine learning network based at least in part on the modified configuration.

17. The apparatus of claim 15, wherein the instructions to modify the configuration are executable by the processor to cause the apparatus to:

select one or more paths of the machine learning network based at least in part on the modified configuration, wherein the one or more paths of the machine learning network are in connection with a residual memory block of the machine learning network.

18. The apparatus of claim 15, wherein the instructions to modify the configuration are executable by the processor to cause the apparatus to:

configure the one or more cross-layer identity connections associated with the machine learning network based at least in part on the modified configuration, wherein the one or more cross-layer identity connections are associated with one or more of the memory blocks and the one or more connections of the machine learning network.

19. The apparatus of claim 15, wherein the instructions to modify the configuration are executable by the processor to cause the apparatus to:
- configure one or more weights associated with the machine learning network based at least in part on the modified configuration.

20. An apparatus comprising:
- means for identifying a performance level associated with an application on the apparatus;
- means for determining, based at least in part on identifying the performance level, that the performance level satisfies a condition;
- means for determining a memory block allocation of a machine learning network of the apparatus based at least in part on the performance level satisfying the condition, the memory block allocation corresponding to one or more connections of the machine learning network, the machine learning network comprising one or more cross-layer identity connections, each cross-layer identity connection of the one or more cross-layer identity connections including an identity function;
- means for adjusting a quantity of memory blocks available for the machine learning network of the apparatus based at least in part on the memory block allocation; and
- means for processing the application by the apparatus including bypassing one or more intermediate layers of the machine learning network using the one or more cross-layer identity connections based at least in part on the adjusted quantity of memory blocks available for the machine learning network.

* * * * *